United States Patent [19]
Swallow et al.

[11] Patent Number: 5,232,604
[45] Date of Patent: Aug. 3, 1993

[54] PROCESS FOR THE OXIDATION OF MATERIALS IN WATER AT SUPERCRITICAL TEMPERATURES UTILIZING REACTION RATE ENHANCERS

[75] Inventors: Kathleen C. Swallow, West Newbury; William R. Killilea, West Chelmsford; Glenn T. Hong, Tewksbury; Alain L. Bourhis, Framingham, all of Mass.

[73] Assignee: Modar, Inc., Houston, Tex.

[21] Appl. No.: 973,217

[22] Filed: Nov. 6, 1992

Related U.S. Application Data

[63] Continuation of Ser. No. 828,469, Jan. 30, 1992, abandoned, which is a continuation-in-part of Ser. No. 706,219, May 28, 1991, Pat. No. 5,106,513, which is a continuation-in-part of Ser. No. 472,766, Jan. 31, 1990, abandoned.

[51] Int. Cl.$^5$ ............................................. C02F 1/72
[52] U.S. Cl. .................................. 210/759; 210/758; 210/760; 210/761; 210/762; 210/763; 210/737; 210/747; 210/779; 210/774; 210/808
[58] Field of Search ............... 210/758, 759, 760, 761, 210/762, 763, 737, 747, 774, 808

[56] References Cited

U.S. PATENT DOCUMENTS

| | | |
|---|---|---|
| 3,912,626 | 10/1975 | Ely et al. |
| 3,984,311 | 10/1976 | Diesen et al. |
| 4,141,828 | 2/1979 | Okada et al. |
| 4,212,736 | 7/1980 | Miller. |
| 4,292,953 | 10/1981 | Dickinson. |
| 4,294,706 | 10/1981 | Kakihara et al. |
| 4,337,199 | 6/1982 | Modell. |
| 4,460,628 | 7/1984 | Nelson et al. |
| 4,543,190 | 9/1985 | Modell. |
| 4,751,005 | 6/1988 | Mitsui et al. |
| 4,792,407 | 12/1988 | Zeff et al. .......................... 210/759 |
| 4,792,408 | 12/1988 | Titmas. |
| 4,822,497 | 4/1989 | Hong et al. |
| 5,075,017 | 12/1991 | Hossain et al. |
| 5,106,513 | 4/1992 | Hong .................................. 210/759 |

OTHER PUBLICATIONS

Bishop et al, *Hydrogen Peroxide Catalytic Oxidation of Refractory Organics in Municipal Waste Waters*, I & EC Process Design & Dev., vol. 7(1) at 110 (1968).

Brett, et al, *Wet Air Oxidation of Glucose with Hydrogen Peroxide and Metal Salts*, J. Appl. Chem. Biotechnol., 1973, 23:239.

Chowdhury, et al, *Catalytic Wet Oxidation of Strong Waste Waters*, AIChE Symposium Ser., 1975, 71(151):46.

Helling et al, *Oxidation Kinetics of Carbon Monoxide in Supercritical Water*, J. of Energy and Fuels, vol. 1 at 417 (1987).

Imamura, Fukuda and Ishida, *Wet Oxidation Catalyzed by Ruthenium Supported on Cerium(IV) Oxides*, Ind. Eng. Chem. Res., 1988, 27:718.

(List continued on next page.)

*Primary Examiner*—Robert A. Dawson
*Assistant Examiner*—David Reifsnyder
*Attorney, Agent, or Firm*—Pravel, Hewitt, Kimball & Krieger

[57] ABSTRACT

Disclosed is a method of substantially completely oxidizing material in an aqueous phase at supercritical temperatures and sub- or supercritical pressures by initiating the oxidation in the presence of small amounts of strong oxidizing agents that function to increase the initial reaction rate for the oxidation. The strong oxidizing agents suitable for use in the present invention comprise at least one selected from the group consisting of ozone ($O_3$), hydrogen peroxide ($H_2O_2$), salts containing persulfate ($S_2O_8^{2-}$), salts containing permanganate ($MnO_4^-$), nitric acid ($HNO_3$), salts containing nitrate ($NO_3^-$), oxyacids of chlorine and their corresponding salts, hypochlorous acid (HOCl), salts containing hypochlorite ($OCl^-$), chlorous acid (HOClO), salts containing chlorite ($ClO_2^-$), chloric acid ($HOClO_2$), salts containing chlorate ($ClO_3$), perchloric acid ($HOClO_3$), and salts containing perchlorate ($ClO_4^-$).

43 Claims, 7 Drawing Sheets

OTHER PUBLICATIONS

Imamura and Sakai, *Wet-Oxidation of Acetic Acid Catalyzed by Copper Salts*, J. Japan. Petrol. Inst., vol. 25(2) at 74 (1982).

Li et al, *Kinetic Model for Wet Oxidation of Organic Compounds in Subcritical and Supercritical Water*, AIChE Annual Meeting (Nov. 17-22, 1991) (unpublished manuscript).

Randall et al, *Detoxification of Specific Organic Substances by Wet Oxidation*, J. Water Pol. Cont. Fed., vol. 52(8) at 2117 (1980).

Rulkens, et al *Feasibility Study of Wet Oxidation Processes for Treatment of Six Selected Waste Streams*, Report DBW/RIZA nota 89-079, Ministry of Transport and Public Works, The Netherlands (1989).

Snow et al, *Testing of Supercritical Water Oxidation (SCWO) at CAMDS*, Technical Report, Tooele Army Depot, Tooele, Utah (Oct. 1990).

Shanableh et al, *Subcritical and Supercritical Water Oxidation of Industrial, Excess Acivated Sludge*, Technical Report CRWR211, Center for Research in Water Resources, U. of Texas (Austin) at 79 (1990).

Skaates et al, *Wet Oxidation of Glucose*, The Can. J. Chem. Eng., vol. 59 at 517 (1981).

Webley, P. A., *Fundamental Oxidation Kinetics of Simple Compounds in Supercritical Water*, Ph.D. Dissertation, Mass. Inst. of Technology (1989).

Webley et al, *Oxidation Kinetics of Ammonia and Ammonia-Methanol Mixtures in Supercritical Water in the Temperature Range 530°-700° at 246 Bar*, Ind. Eng. Chem. Res., vol. 30 at 1745 (1991).

Weygandt, *High Pressure Oxidation of Organic Compounds in Aqueous Solution*, University Microfilms, Inc. (1969) (Dialog printout).

Willms, et al, *Aqueous-Phase Oxidation: The intrinsic Kinetics of Single Organic Compounds*, Ind. Eng. Chem. Res., vol. 26, No. 1 at p. 148 (1987).

PROCESS FOR THE OXIDATION OF MATERIALS IN WATER AT SUPERCRITICAL TEMPERATURES UTILIZING REACTION RATE ENHANCERS

This is a continuation of co-pending application Ser. No. 7,828,469 filed on Jan. 30, 1992, now abandoned, which is a continuation-in-part of U.S. patent application Ser. No. 706,219, filed May 28, 1991, issued on Apr. 21, 1992 as U.S. Pat. No. 5, 106,513, which was a continuation-in-part of U.S. patent application Ser. No. 472,766 filed Jan. 31, 1990, now abandoned.

BACKGROUND OF THE INVENTION

1. Field of the Invention

This invention relates to processes for the oxidation of materials. In another aspect, this invention relates to processes for the oxidation of materials in the presence of water at supercritical water temperatures and optionally at supercritical water pressures. In still another aspect, this invention relates to oxidation of materials in the presence of water at supercritical water temperatures and optionally at supercritical water pressures, wherein the initial oxidation rate is enhanced by the presence of small amounts of strong oxidizing agents.

2. Description of the Related Art

The use of oxidation reactions to destroy organic molecules by combining them with oxygen to form carbon dioxide, water and inorganic compounds is the basis of many waste treatment methods ranging from the biological treatment used for sewage to the high temperature incineration used for hazardous waste. The required destruction efficiency and the relative costs and throughput capabilities of candidate methods affect the choice of destruction method for a particular waste. For hazardous wastes, the public generally requires that destruction efficiencies approach one hundred percent.

Incineration is capable of achieving the high destruction efficiency required for hazardous waste destruction. The high temperature oxidation reactions which take place in incinerators are rapid free radical reactions. Innovations such as the fluidized bed and the rotary kiln have improved the mass transport and mixing of oxidant and waste to optimize destruction efficiency. Incinerators, however, have met with public resistance and permitting difficulties largely because of the gaseous emissions which may contain unreacted toxic compounds, products of incomplete combustion or acid rain precursors. Incineration is also limited to solid wastes, organic liquids, or relatively concentrated aqueous solutions of organic compounds; otherwise prohibitive amounts of auxiliary fuel must be added to provide sufficient heating value to maintain optimum incineration temperature.

Wet Air Oxidation (or wet oxidation) is a process that overcomes some of the disadvantages of incineration. Wet Air Oxidation is a two phase oxidation in which the liquid phase contains that material to be oxidized and the vapor phase contains the oxidant, and the reaction takes place essentially in the liquid phase. This technology has been around since the early 1960's. Conventional Wet Air Oxidation is carried out at relatively low, subcritical temperatures (150°–370° C.) and elevated pressures (30–250 bar). Wet Air Oxidation provides oxidation efficiencies in the 50 to 85 percent range, which is not an adequate destruction efficiency for many hazardous wastes, but it is useful in reducing the toxic components of the waste to smaller molecular weight organic acids and aldehydes. These low molecular weight, oxygenated compounds resist further chemical oxidation but can be treated biologically or with activated carbon.

The mechanism of the wet oxidation reaction is not well understood. See, Rulkens et al., "Feasibility Study of Wet Oxidation Processes For Treatment of Six Selected Waste Streams", Report DBW/RIZA nota 89-079, Ministry of Transport and Public Works, The Netherlands (1989). While some data seems to argue against a free radical mechanism, see, Weygandt, "High Pressure Oxidation of Organic Compounds in Aqueous Solution", University Microfilms, Inc. (1969), other researchers have found an induction period for the oxidation reaction, which can be described as the time needed to obtain a critical concentration of free radicals, followed by a steady-state period, which suggests that the reaction does proceed by a free radical mechanism. See, Willms et al., "Aqueous-Phase Oxidation: The Intrinsic Kinetics of Single Organic Compounds", Ind. Eng. Chem. Res., vol. 26 at 148 (1987). See also, Skaates et al., "Wet Oxidation of Glucose", Can. J. of Chem. Eng., vol. 59 at 517 (1981). At low temperatures, however, the reaction rate is slow and wet oxidation requires long residence times. While increasing the temperature increases the reaction rate and the organic carbon degradation, it also increases the corrosion rate and the energy requirements for the process. Since it is desirable to operate a wet oxidation reactor at low temperature, the use of catalysts to increase the reaction rate at low temperatures has been explored.

The catalytic effect of transition metal cations, particularly Cu(II) and Fe(III), has been demonstrated for wet oxidation of wastes. See, Imamura et al., "Wet-Oxidation of Acetic Acid Catalyzed by Copper Salts", J. Japan. Petrol. Inst., vol. 25(2) at 74 (1982), and see, Randall et al., Detoxification of Specific Organic Substances by Wet Oxidation", J. Water Pol. Cont. Fed., vol. 52(8) at 2117 (1980). U.S. Pat. No. 3,912,626, issued Oct. 14, 1975 to Ely et al., discloses the use of Cu(II) and Ag(I) cations to improve the degradation of wastewater chemical oxygen demand by wet oxidation. Other studies have shown that the addition of hydrogen peroxide ($H_2O_2$), along with various cations enhances the catalytic effect by providing a source of free radicals. See, Bishop et al., "Hydrogen Peroxide Catalytic Oxidation of Refractory Organics in Municipal Wastes", I&EC Process Design and Dev, vol. 7 at 110 (1968), and see, Chowdhury et al., "Catalytic Wet Oxidation of Strong Waster Waters", AICHE Symposium Ser., vol. 71, no. 151 at 46 (1975).

In U.S. Pat. No. 3,984,311, issued Oct. 5, 1976 to Diesen et al , it is disclosed that a mixture of nitrate and iodide or bromide ions increases the rate of the wet oxidation reaction. Miller, in U.S. Pat. No. 4,212,735, issued Jul. 15, 1980, teaches that the addition of a transition metal ion to the nitrate/iodide(bromide) system enhances the rate increase effect. The nitrate/iodide(bromide) system, however, undergoes oxidation/reduction reactions in the process and is, therefore, a reactant and not strictly speaking a catalyst. Similarly, dichromate in combination with hydrogen peroxide also increases the rate of wet oxidation, but the Cr(VI) in the dichromate ion is reduced to Cr(III). See, Brett et al., "Wet Air Oxidation of Glucose with Hydrogen Peroxide and Metal Salts", J. Apol. Chem. Biotechnol., vol. 23 at 239 (1973). Both nitrate and dichromate may be classified as auxiliary oxidizing agents rather than as catalysts.

U.S. Pat. No. 4,460,628 issued Jul. 17, 1984 to Wheaton et al., discloses that heterogenous catalysts consisting of either elemental metals or solid metal oxides or salts provide some catalytic effect in wet oxidation. See also, Imamura et al. "Wet Oxidation Catalyzed by Ruthenium Supported on Cerium (IV) Oxides", *Ind. Eng. Chem. Res.*, vol. 27 at 718 (1988), and see, Chowdhury et al., supra.

The processes disclosed in U.S. Pat. No. 4,294,706 issued 1981 to Kakihara et al. and in U.S. Pat. No. 4,141,828, issued Feb. 27, 1979 to Okada et al., depend on the use of a heterogeneous catalyst for conversion of ammonia to nitrogen at the low temperatures used in wet oxidation.

U.S. Pat. No. 4,751,005 issued Jun. 14, 1988 to Mitsui et al. teaches the use of a mixed metal/metal oxide catalyst for wet oxidation of waste water, and further teaches the use of molecular oxygen and ozone and/or hydrogen peroxide as an oxidizing agent for wet oxidation of waste water.

While Wet Air Oxidation is in some aspects an improvement over incineration in the disposal of hazardous wastes, it still does not achieve a high enough oxidation of organic carbon to $CO_2$. In addition, wet oxidation residence times are relatively high which increases the reactor cost.

Wet oxidation at supercritical temperature and optionally supercritical pressure has been suggested as an improvement over conventional wet oxidation.

Supercritical Water Oxidation, described in U.S. Pat. Nos. 4,338,199, issued Jul. 6, 1982, and 4,543,190, issued Sep. 24, 1985, both to Modell and U.S. Pat. No. 4,822,497, issued Apr. 18, 1989 to Hong et al., all hereby incorporated by reference, can achieve the high destruction efficiency required for hazardous waste destruction and it is applicable to dilute aqueous waste streams containing less than about 20 percent organic carbon which cannot be economically incinerated. The Supercritical Water Oxidation reaction takes place at elevated supercritical water temperatures (374°–700° C.) and supercritical water pressures (greater than about 221 bar) in a homogeneous supercritical fluid.

A counterpart to Supercritical Water Oxidation is Semicritical Water Oxidation, described in more detail below, which takes place at elevated supercritical temperature (374°–700° C.), but at subcritical pressures between 25 bar and the critical pressure of water.

Although the supercritical temperature range utilized in both Supercritical and Semicritical Water Oxidation is significantly lower than those typical of incineration, the oxidation reactions in both Supercritical and Semicritical Water Oxidation are also rapid free radical reactions. Therefore, residence time under one minute is sufficient for complete conversion of most organic compounds to carbon dioxide, water, and inorganic compounds at around 550° C.

In Supercritical and Semicritical Water Oxidation of wastes, the pressurized aqueous waste stream or waste mixed with water is fed into a tubular or vessel reactor along with compressed air or oxygen as the oxidant. The processes may also be carried out below ground in a deep well reactor as disclosed in U.S. Pat. No. 4,792,408, issued Dec. 20, 1988 to Titmas. U.S. Pat. No. 4,861,497 to Welch et al. teaches the replacement of air or oxygen as the oxidizing agent in Supercritical Water Oxidation with liquid phase $H_2O_2$, ozone, inorganic oxides that decompose to yield oxygen, or mixtures of the above, within a combination heat exchanger/reactor. The possibility of using a sodium hypochlorite solution as the oxidizing agent has been suggested. See, Snow and Levi, "Testing of Supercritical Water Oxidation (SCWO) at CAMDS", Technical Report 03-01, Tooele Army Depot, Tooele, Utah, October, 1990.

In a report coauthored by E. F. Gloyna, it was suggested that a mixture of oxygen and hydrogen peroxide could be used as the oxidizing agent, although no mixture proportions or experimental data have been given. See, Shanableh and Gloyna, "Subcritical and Supercritical Water Oxidation of Industrial, Excess Activated Sludge", Technical Report CRWR211, Center for Research in Water Resources, U. of Texas, Austin, Tex., at page 79 (1990). However, in a subsequent report out of the University of Texas, also coauthored by Gloyna, it is disclosed that the initial reaction rates for subcritical water oxidation using oxygen are expected to be lower as compared to hydrogen peroxide due to the limited mass-transfer rate between the gas and liquid phases of the subcritical water oxidation reaction. It is further disclosed that for supercritical water oxidation (a single phase reaction) the effectiveness of oxygen and hydrogen peroxide as oxidants is kinetically comparable..See, Li, Chen and Gloyna, "Kinetic Model for Wet Oxidation of Organic Compounds in Subcritical and Supercritical Water", Annual Meeting, Nov. 17–22, 1991, at pages 4–5.

U.S. Pat. No. 5,075,017, issued Dec. 24, 1991 to Hossain et al. discloses that mixtures of oxidants can be used in supercritical water oxidation. However, no proportions or data are presented.

While liquid phase oxidants may be useful in certain situations, they are not in general preferred due to their higher cost. For example, $H_2O_2$ costs about forty times more than pure oxygen per unit of available oxygen, while nitric acid costs three times more.

As the waste/oxidant mixture is rapidly heated above the critical point of water (374° C.) in Super- or Semicritical Water Oxidation, a rapid oxidation reaction converts the organic carbon and hydrogen to $CO_2$ and $H_2O$. Inorganic salts and oxides are typically relatively insoluble in the fluid/gas phase and precipitate in the reactor. Inorganic acids such as the haloacids, HX (X=F, Cl, Br or I), sulfuric acid, $H_2SO_4$, or phosphoric acid, $H_3PO_4$, are formed when heteroatomic molecules containing halogens, sulfur or phosphorus are oxidized. These acids remain in the gas phase unless they are neutralized in situ by addition of a caustic material such as NaOH to the reactor. Neutralization produces salts which, as mentioned, precipitate in the reactor.

When a vessel reactor is used, any precipitates deposited in it can be removed from the bottom in an aqueous brine solution or slurry as disclosed in the Hong '497 patent. The brine phase is formed by creating a temperature gradient down the length of the reactor vessel so that the bottom of the vessel is below the critical temperature of water and an aqueous phase forms.

Although the Super- or Semicritical Water Oxidation reaction is rapid, some refractory compounds react more slowly and require higher temperature or longer residence time for complete conversion. Modell (U.S. Pat. No. 4,338,199) suggested the use of common metal oxide or supported metal catalysts in the Supercritical Water Oxidation process. Webley, "Fundamental Oxidation Kinetics of Simple Compounds in Supercritical Water", Ph.D. Dissertation, Massachusetts Institute of Technology, 1989, has suggested the addition of free radical sources and initiators such as $H_2O_2$ to Supercritical Water Oxidation systems. The catalytic effect of nickel on the oxidation of carbon monoxide and ammonia has been investigated with mixed results. See, Helling et al., "Oxidation Kinetics of Carbon Monoxide in Supercritical Water", *J. of Energy and Fuels*, 1987, volume 1 at 417, and see, Webley et al., "Oxidation Kinetics of Ammonia and Ammonia-Methanol Mixtures in Supercritical Water in the Temperature Range 530°-700° C. at 246 Bar", *Ind. Eng. Chem. Res.*, Volume 30. at 1745, 1991. While nickel appeared to have no significant catalytic effect on carbon monoxide oxidation, it did increase the rate of ammonia oxidation. The enhancement of the ammonia oxidation rate, however, was less than would be expected for a purely catalytic reaction which suggests a more complex mechanism. Others have postulated that inorganic components of the waste feed to the process may provide a catalytic effect, but this has not been studied.

A variation of the Supercritical Water Oxidation process, is the hybrid wet oxidation/Supercritical Water Oxidation process which is described in U.S. Pat. No. 4,292,953, issued Oct. 6, 1981 to Dickinson, hereby incorporated by reference. In Dickinson's scheme, the oxidation reaction is initiated under subcritical wet oxidation conditions. As the reaction proceeds heat is released and the process stream temperature eventually exceeds the critical temperature of water. The heatup to the critical temperature may be aided by the addition of external heat, with for example, an electrical or fired heater, or regenerative heat exchange. As described, this process typically uses an alkali catalyst such as sodium carbonate or calcium carbonate. Another variation would be a hybrid wet oxidation/Semicritical Water Oxidation process.

Supercritical Water Oxidation, Semicritical Water Oxidation and the hybrid oxidation schemes, all have an advantage over wet oxidation and incineration for waste destruction in that all provide complete oxidation of organic carbon to $CO_2$ with no noxious by-products in relatively short residence times. However, while the residence times in these methods are relatively short, it is still desirable to further reduce the residence time. The initial reaction rate is an important parameter in reactor design. A faster initial reaction rate would mean a reduction in the required residence time to achieve a given destruction efficiency. A shorter required residence time can minimize the efflux of partially oxidized by-products and optimize plant throughput capability. It can facilitate complete conversion of refractory compounds such as acetic acid to $CO_2$ at moderate temperatures.

Therefore, a need exists in the oxidation art for a way to increase the oxidation reaction rate so that residence times can be reduced thereby minimizing the efflux of partially oxidized by-products and optimizing plant throughput capability.

SUMMARY OF THE INVENTION

According to one embodiment of this invention there is provided a method of increasing the initial reaction rate for Supercritical Water Oxidation by initiating the oxidation in the presence of small amounts of strong oxidizing agents.

According to another embodiment of this invention there is provided a method of increasing the initial reaction rate for Semicritical Water Oxidation by initiating the oxidation in the presence of small amounts of strong oxidizing agents.

According to yet another embodiment of this invention there is provided a method of increasing the initial reaction rate for hybrid oxidation systems by initiating the oxidation in the presence of small amounts of strong oxidizing agents.

These oxidizing agents or reaction rate enhancers include ozone ($O_3$), hydrogen peroxide ($H_2O_2$), salts containing persulfate ($S_2O_8^{2-}$), salts containing permanganate ($MnO_4^-$), nitric acid ($HNO_3$), salts containing nitrate ($N_3^-$), oxyacids of chlorine and their corresponding salts, hypochlorous acid ($HOCl$), salts containing hypochlorite ($OCl^-$), chlorous acid ($HOClO$), salts containing chlorite ($ClO_2^-$), chloric acid ($HOClO_2$), salts containing chlorate ($ClO_3^-$), perchloric acid ($HOClO_3$), and salts containing perchlorate ($ClO_4^-$).

The enhancement effect is observed both when the initial temperature of the mixed feeds at the nozzle tip is subcritical and when it is supercritical. It is therefore an object of this invention to utilize reaction rate enhancers with a primary oxidant, such as oxygen or air, for treating materials, such as water contaminated with organic and inorganic materials, at conditions above the critical point of water (i.e. both temperature and pressure are supercritical for water). These conditions are denoted as supercritical.

It is still a further object of this invention to utilize reaction rate enhancers with a primary oxidant for treating materials, such as water contaminated with organic and inorganic materials, at supercritical temperatures and subcritical, yet elevated, pressures of water. These conditions will be referred to as semicritical.

It is still a further object of this invention to utilize reaction rate enhancers with a primary oxidant for treating materials at conditions initially of subcritical temperature and elevated pressure, eventually attaining conditions exceeding the critical temperature of water. These conditions will be referred to as hybrid wet oxidation/supercritical.

BRIEF DESCRIPTION OF THE DRAWINGS

The theoretical basis for the invention and its preferred embodiments will best be understood by reference to the attached drawings, which are listed below:

FIG. 3 shows an embodiment of the present invention for oxidizing a dilute aqueous stream;

FIG..7 is a schematic diagram of an apparatus used in one embodiment of the present invention.

Figure 8:
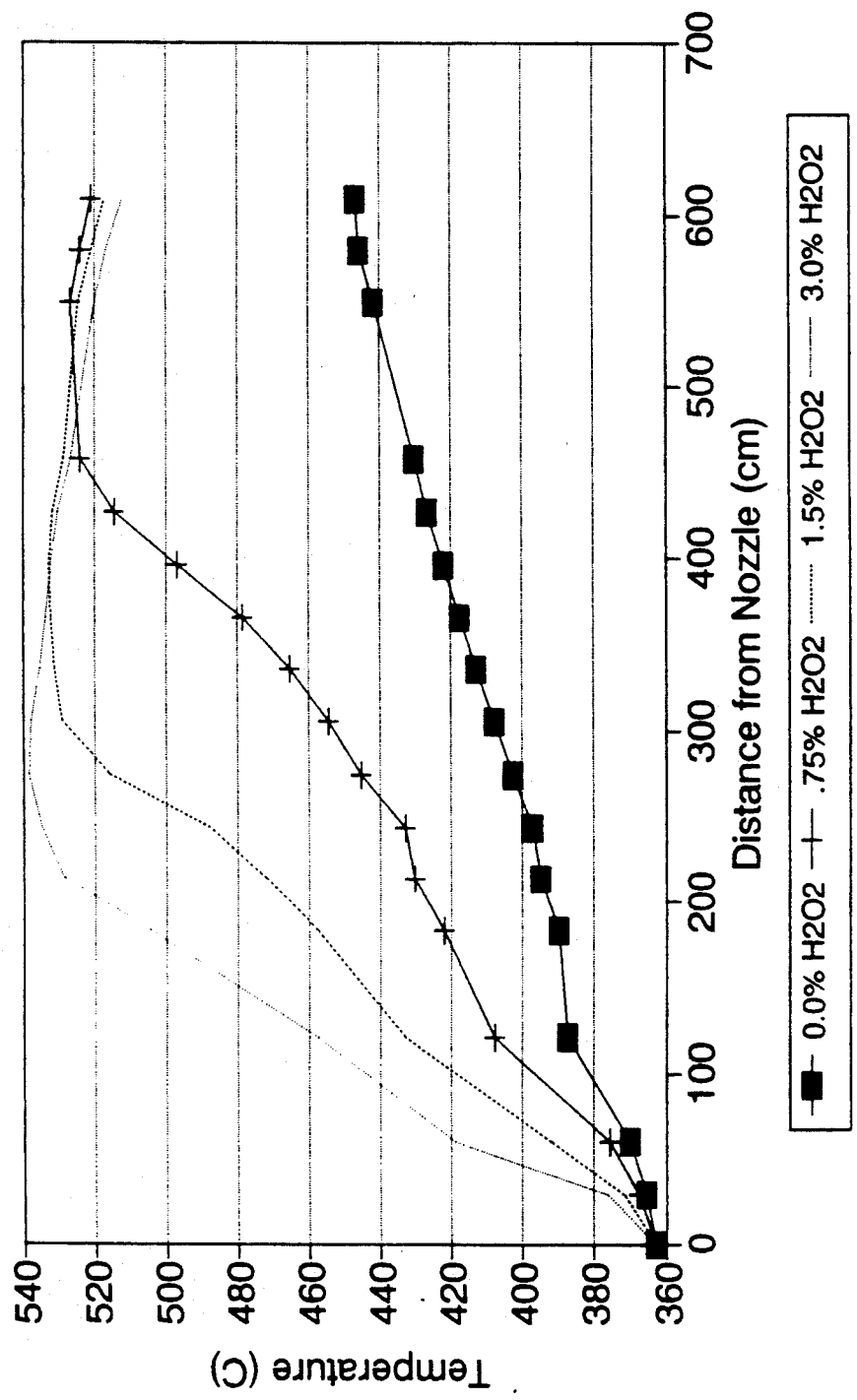

FIG. 8 is a diagrammatic showing the effect of varying concentrations of $H_2O_2$ on the reactor temperature profile during oxidation of isopropanol in a tubular reactor.

Figure 9:
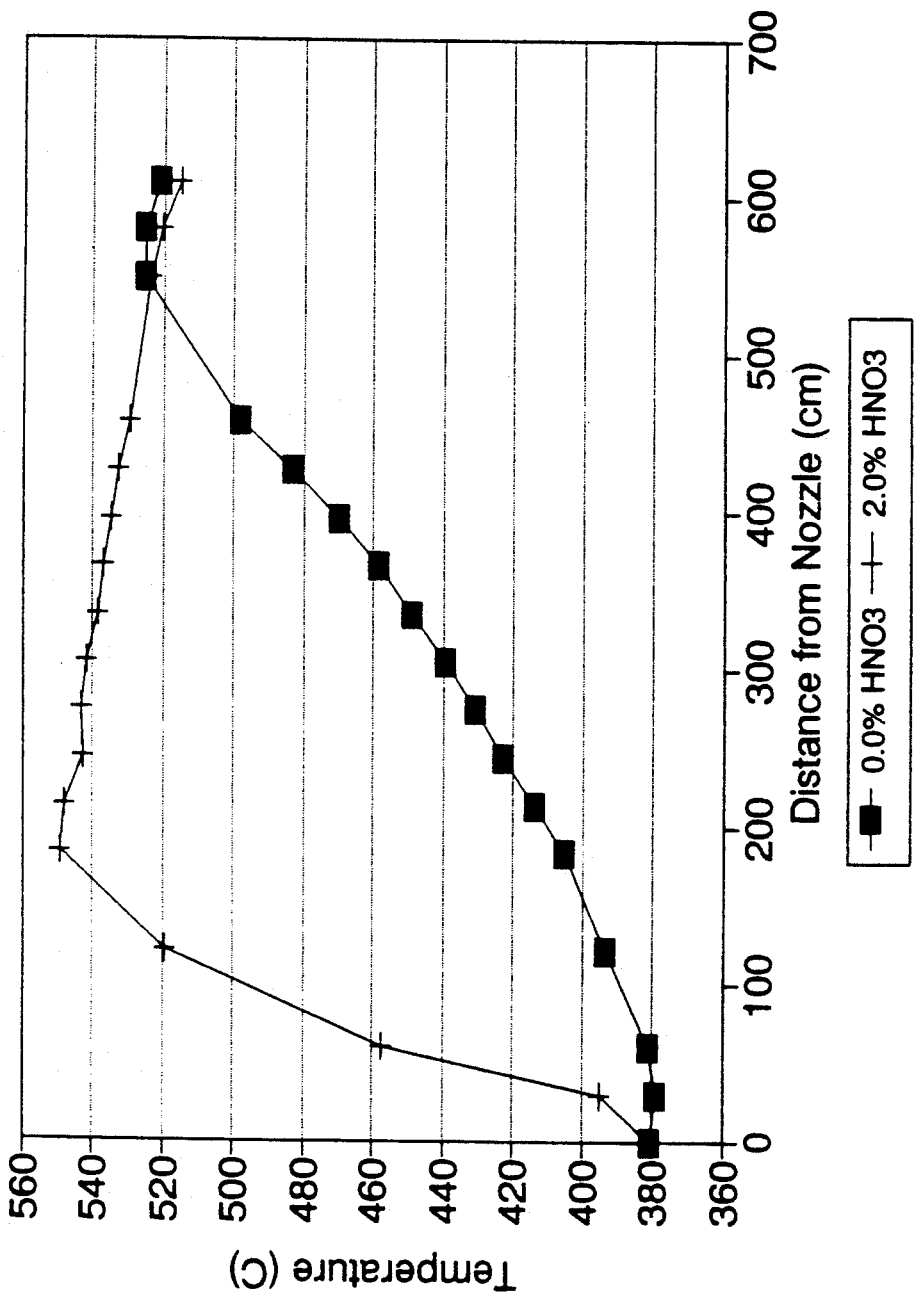

FIG. 9 is a diagrammatic showing the effect of HNO₃ on the reactor temperature profile during oxidation of isopropanol in a tubular or pipe reactor.

DETAILED DESCRIPTION OF THE INVENTION

Semicritical Water Oxidation

It has now been found that whole streams of aqueous mixtures may be substantially completely oxidized in a rapid, self-sustaining reaction at conditions for water which are supercritical in temperature but subcritical in pressure, without the need for a catalyst. This process, which will be referred to as Semicritical Water Oxidation, has a destruction efficiency greater than about 95.0% preferably greater than about 99.0%. Such a process is complementary to the previously described process of Supercritical Water Oxidation, but for certain feed streams, the Semicritical Water Oxidation will be preferred over the Supercritical Water Oxidation process. Supercritical temperatures are required in Semicritical Water Oxidation to achieve high reaction rates, preferred temperatures for complete oxidation being between about 500°–800° C. The useful lower limit of pressure for Semicritical Water Oxidation will depend on the particular material being oxidized and its concentration in the aqueous stream. For combustion in air at atmospheric pressure, for example, it is known that the ignition temperature (the lowest temperature for self-sustaining combustion) for different materials varies widely, e.g., 650° C. for methane compared to 300° C. for gasoline. Increasing pressure typically decreases ignition temperature for a given material in near-ambient pressure combustion. These principles should apply as well to reaction in a pressurized steam environment, although ignition temperatures are not well-known due to the preponderance of water. For materials which are difficult to ignite, higher pressures will be required, while for easily ignited materials lower pressures will prove satisfactory. Increasing pressure serves to increase reactant concentration (moles per liter) and thereby may enable self-sustaining reaction for streams with a low fraction of combustible material. Pressures as low as approximately 25 bar (360 psi) are expected to be useful for the Semicritical Water Oxidation process.

Semicritical Water Oxidation and Supercritical Water Oxidation have many similarities. Both processes operate at similar temperatures. In both processes, gases and non-solid combustibles are completely miscible in the aqueous phase, allowing intimate reactant contact and high reaction rates. For a given feed, the choice between operating at subcritical or supercritical pressure will not usually depend on the extent of reaction attainable. More typically, it will depend on the behavior of inorganic compounds within the reactor. These inorganics are introduced as feed constituents or generated as reaction products. At a given temperature, inorganics such as salts or metal oxides will typically have a lower solubility at subcritical as compared to supercritical pressures, allowing the recovery of a cleaner liquid product with Semicritical Water Oxidation. Aside from this quantitative difference, it has also been discovered that there exists for some feeds a qualitative difference in salt behavior. U.S. Pat. No. 4,338,199 to Modell has previously taught that temperatures in excess of 450° C. are useful for precipitating solid salts. While these conditions are frequently useful, it is also found in many cases that subcritical pressures are required or preferred to precipitate salts exclusively as solids rather than as dense brines or mixtures of particulates and dense brine. Important examples include potassium chloride, many bromide and iodide salts, and many salt mixtures, for example, sodium chloride/sodium carbonate and sodium chloride/sodium sulfate. Formation of solids rather than brines can be crucial to the operation of certain separation devices, e.g., filters. Moreover, the highly corrosive nature of many dense brines is frequently a reason to prefer the precipitation of salts as a solid phase.

On the other hand, in some applications, separations of a brine rather than a solid may be desirable. Pressures below critical can allow separation of fluid phases which are completely miscible at supercritical conditions because for a given temperature at elevated pressures, the vapor-liquid envelope of salt water systems typically broadens as pressure is decreased over a substantial range. For example, a 5 wt. % solution of salt may exist as a single fluid phase at 600° C. and 250 bar, but split into vapor and liquid phases at 600° C. and 150 bar. This liquid phase is typically highly concentrated in salt, while the vapor phase has a very low salt content. Separating the phases thus allows an effective desalination of the process stream. Separation of the liquid and vapor phases may be carried out by conventional means, e.g., gravity settling, cyclonic action, or mist extraction.

In certain cases, the use of subcritical pressures may have other advantages over the use of supercritical pressures. While Supercritical Water Oxidation requires a thicker walled vessel due to high operating pressure, the less dense process stream in Semicritical Water Oxidation necessitates a larger vessel to achieve a comparable residence time. Thus, reactor costs may be roughly equivalent for the two schemes. In other portions of the plant, however, capital and operating expenses will be reduced by the lower pressures utilized with Semicritical Water Oxidation. Because dissolved solids in the Semicritical Water Oxidation process effluent will be lower, this stream becomes more useful for power or heat recovery, or recycling. The less extreme pressure should also make it easier to adapt Semicritical Water Oxidation to power recovery. If power is not recovered, the process effluent from Semicritical Water Oxidation is frequently more compatible with the requirements for generating plant or process steam.

The present invention may also be applied in a deep well reactor configuration. With the combination of supercritical temperature but subcritical pressure, it represents an improvement in that short residence times may be used in relatively shallow wells.

Reaction Rate Enhancers

The present invention utilizing reaction rate enhancers has applicability in Supercritical Water Oxidation, Semicritical Water Oxidation, and hybrid oxidation systems. The present invention is a method of oxidation, in which the initial reaction rate of those systems is increased by initiating the oxidation reaction in the presence of a reaction rate enhancer.

The reaction rate enhancer may be added to the reaction in the same stream as the oxidant or in a different stream.

Generally, strong oxidizing agents are utilized as the reaction rate enhancers. Preferably, oxidizing agents which are stronger oxidizers than nitric acid are utilized in the present invention. Generally, the oxidizing agent or reaction rate enhancer suitable for use in the present invention comprises at least one selected from the group consisting of ozone ($O_3$), hydrogen peroxide ($H_2O_2$), salts containing persulfate ($S_2O_8{}^{2-}$), salts containing permanganate ($MnO_4{}^-$), nitric acid ($HNO_3$), salts containing nitrate ($NO_3{}^-$), oxyacids of chlorine and their corresponding salts, hypochlorous acid (HOCl), salts containing hypochlorite ($OCl^-$), chlorous acid (HOClO), salts containing chlorite ($ClO_2{}^-$), chloric acid ($HOCl_2$), salts containing chlorate ($ClO_3{}^-$), perchloric acid ($HOClO_3$), and salts containing perchlorate ($ClO_4{}^-$). Preferably, the reaction rate enhancer comprises at least one selected from the group consisting of hydrogen peroxide, nitric acid and salts containing nitrate. Most preferably, the reaction rate enhancer comprises at least one selected from the group consisting of nitric acid and salts containing nitrate.

In the process of the invention the reaction rate enhancers are chemically reduced, but they are not present in sufficient concentration to replace air or oxygen as the primary oxidant. Rather, they cause more rapid initiation of the oxidation reaction. The exothermic oxidation reactions are autocatalytic in that the temperature increase due to heat produced by the reaction causes the reaction rate to increase further. The initiators react rapidly close to the feed input point providing heatup and catalyzing the reaction of the feed with the primary oxidant. The rapid initiation of the reaction allows for optimum use of the available residence time. Because of this advantage the reactor volume can be minimized and/or the initiating temperature kept low, both of which are economically beneficial. Furthermore, this invention avoids the drawback of the prior art which uses large amounts of expensive liquid oxidants, such as hydrogen peroxide as the primary oxidant. The invention is useful for any reactor design in which rapid initiation of oxidation is desirable.

In the present invention, the reaction rate enhancers provide the most benefit during the initiation of the oxidation reaction. Preferably, the reaction rate enhancers are utilized during the initiation of the oxidation reaction when temperatures are relatively low. Most preferably, the reaction rate enhancers are utilized during the initiation of the oxidation reaction when temperatures are less than about 450° C.

In a batch process the oxidation reaction is initiated at the start of the reaction, therefore, the reaction rate enhancer is used primarily at the start of the batch process to initiate the oxidation reaction.

For a batch reaction, the initiation of the oxidation reaction is generally considered to be that period during which the reaction rate enhancer will have an enhancing effect on the oxidation reaction.

In a continuous process, unoxidized material is continuously being introduced into the reactor to be oxidized, therefore, oxidation is initiated continuously for the continuously introduced unoxidized material. The reaction rate enhancer is generally present in the reactor volume or volumes where the oxidation reaction is being initiated. Preferably, the reaction rate enhancer will be added continuously during the process in such a manner to enhance the oxidation rate of the continuously introduced unoxidized material.

In a conventional continuous reactor the reaction rate enhancer is introduced near the nozzle tip in such a manner that it is used primarily to enhance the initial oxidation rate of the continuously introduced unoxidized material to be oxidized.

In the present invention, the reaction rate enhancer may be used to provide up to about 100 percent of the oxygen required during the initiation stage of the oxidation process. Of course, the exact percentage will be a function of economic, technical and other considerations of the process.

Generally, once the oxidation process is through the initiation stage, the benefit of utilizing the reaction rate enhancer is greatly diminished. This means that for the most part, subject to economic and technical considerations, that the reaction rate enhancer will not be utilized once the reaction is through the initiation stage. Therefore, in terms of the total oxidation reaction, the percentage of reaction rate enhancer utilized will generally not exceed the amount of oxygen required during the initiation stage divided by the total stoichiometric amount of oxygen required for the reaction multiplied by 100. Of course this percentage will be subject to economic and engineering considerations, but is preferably less than about 50 percent, most preferably less than about 25 percent, and even most preferably less than about 5 percent.

The reaction rate enhancer may be introduced into the oxidation reactor by any suitable method. Generally the reaction rate enhancer will be introduced into the oxidation reactor as a separate feed stream, in the stream containing the material to be oxidized, with the oxidant, in a recycle stream or in any other manner in which oxidant or other feeds are introduced into the oxidation reactor.

EXAMPLES

Examples 1 to 6 are illustrative of Semicritical Water Oxidation. Examples 7 to 11 are illustrative of the use of reaction rate enhancers.

Example 1

Figure 1:
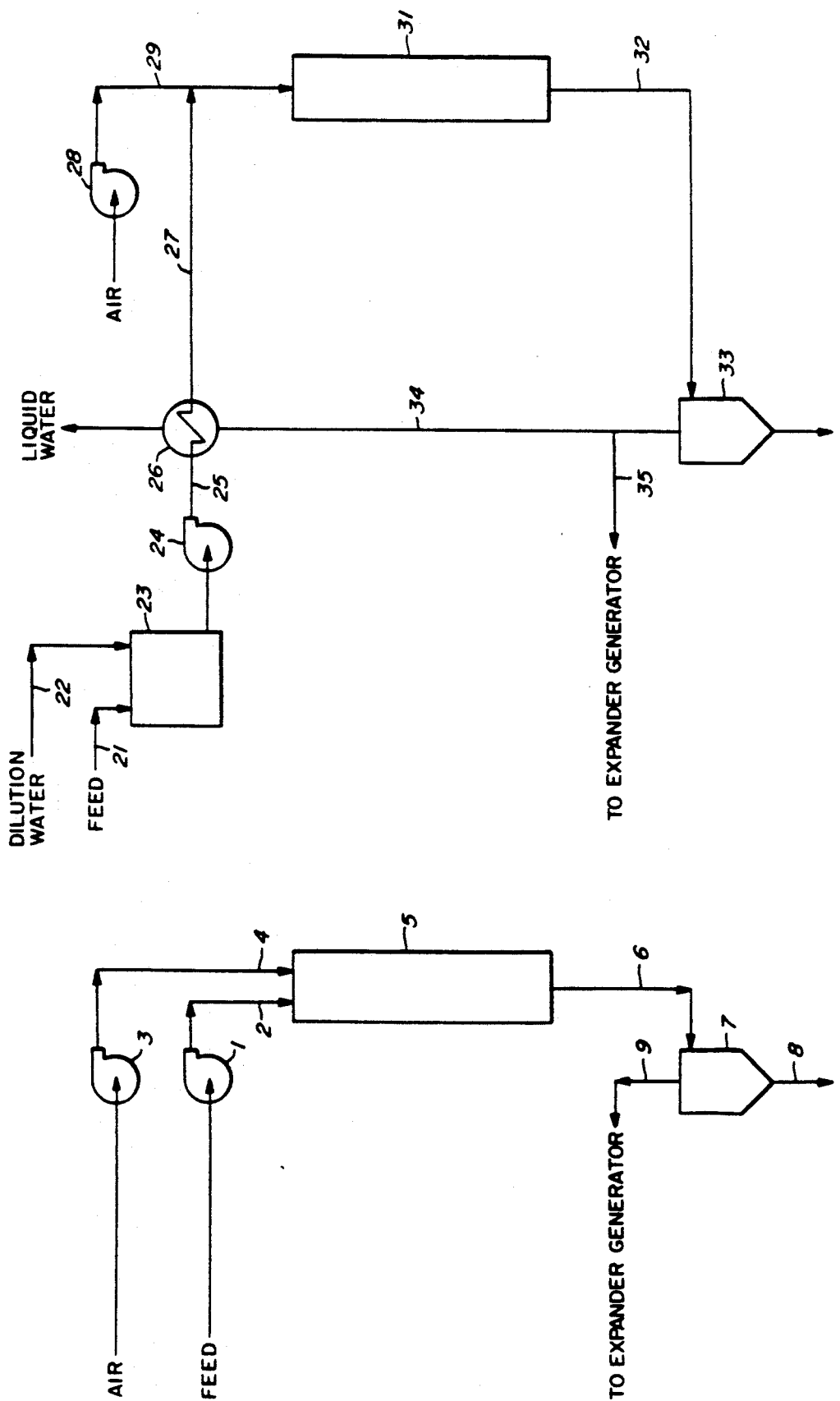
FIG. 1 shows an embodiment of the present invention for oxidizing a concentrated aqueous stream.

FIG. 1 depicts an embodiment of the invention useful for the generation of power or high pressure steam from coal. For a cold startup, the system is brought to operating conditions using an auxiliary furnace. The furnace is used to produce steam, which is run through the system to provide heatup. Mass flows and temperatures during normal operation are given in Table 1.

TABLE 1

Mass flows and temperatures for the pressurized steam oxidation of a 13 wt. % aqueous coal slurry. Coal heating value has been approximated at 30,000 kJ/kg (13,000 Btu/lb.). System pressure = 200 bar.

| Stream | T (°C.) | $H_2O$ | $O_2$ | $N_2$ | $CO_2$ | Coal | Sulfates + Ash | Total |
|---|---|---|---|---|---|---|---|---|
| 2 | 25 | 87.0 | — | — | — | 13.0 | — | 100.0 |
| 4 | 100 | — | 34.0 | 128.0 | — | — | — | 162.0 |
| 6 | 563 | 93.2 | 3.1 | 128.2 | 35.8 | — | 1.8 | 262.0 |
| 8 | 563 | — | — | — | — | — | 1.8 | 1.8 |
| 9 | 563 | 93.2 | 3.1 | 35.8 | 35.8 | — | — | 260.2 |

A 13 wt. % slurry of pulverized coal is brought to pressure by slurry pump 1, and enters the vessel reactor 5. An air stream which was pressurized by compressor 3 enters the reactor separately. The multiphase mixture is rapidly brought to reacting conditions by mixing with a portion of the reactor contents. Particulate ash will precipitate in the reactor as the coal is combusted. As a result of the oxidation reaction, reduced sulfur in the coal is converted to sulfate anion, which only partially pairs with cations available in the native coal. The surplus sulfate is present as sulfuric acid, which depending upon concentration, can lead to accelerated corrosion within the reactor or equipment further downstream. For this reason, a cation supplier such as sodium hydroxide may be added to the feed before it is pressurized, or directly to the reactor to allow the precipitation of sodium sulfate within the reactor (not shown in FIG. 1). On the other hand, it is sometimes preferable to allow relatively low levels of acid to pass through the reactor and cooling section to avoid increased solids precipitation. Depending upon effluent requirements, neutralization may then be carried out on the cool effluent liquid. The reactor 5 may be designed to allow for simultaneous combustion and solids removal as per U.S. Pat. No. 4,822,497 assigned to MODAR, Inc. FIG. 1 shows the alternative of a discrete solids separator 7, which may be a settling column, cyclone, filter, or equivalent device. Dry solids are removed from the solids separator via stream 8, while the entire fluid portion of the reactor effluent passes to an expander-generator for power and/or heat recovery. Note that in generating power by this scheme, heat is transferred to the working fluid without the intervention of heat transfer surfaces. In addition to inherent efficiency, the traditional problems of scaling and hot spots on heat transfer surfaces has been avoided. Because of the solids removal step at 7 and the intimate contact of gas and liquid streams during pressure/temperature letdown, another benefit of this scheme is that scrubbing off-gases, even for "dirty" fuels, is not required. Furthermore, the temperatures attained in the supercritical temperature water oxidation reactor are considerably lower than those associated with conventional combustion processes, and $NO_x$ and $SO_2$ gases are formed only in negligible amounts.

In this example, a 13 wt. % coal slurry is sufficient to heat the incoming slurry from ambient to a reactor temperature of 563° C. If a higher reactor temperature were found to be more desirable, a number of alternatives would be available:

(1) increase the slurry fuel fraction by adding coal or removing water;

(2) add a supplemental fuel, for example, waste oil or solvents;

(3) heat the feed stream by using regenerative heat exchange with some or all of the reactor effluent; or (4) heat the feed stream or reactor with an external heat source, e.g., a natural gas burner or steam.

Conversely, if a lower reactor temperature were found more desirable, the following alternatives could be considered:

(1) add dilution water or other dilute stream to the feed stream or reactor; or (2) cool the reactor.

Using these methods, it will usually be possible to match the heating value of a wide variety of wastes or other feeds to the desired reactor temperature. The process configuration of FIG. 1 is particularly suited to feeds with a relatively high fuel content, in the range of 4200 kJ/kg (1800 Btu/lb.).

Example 2

Figure 2:
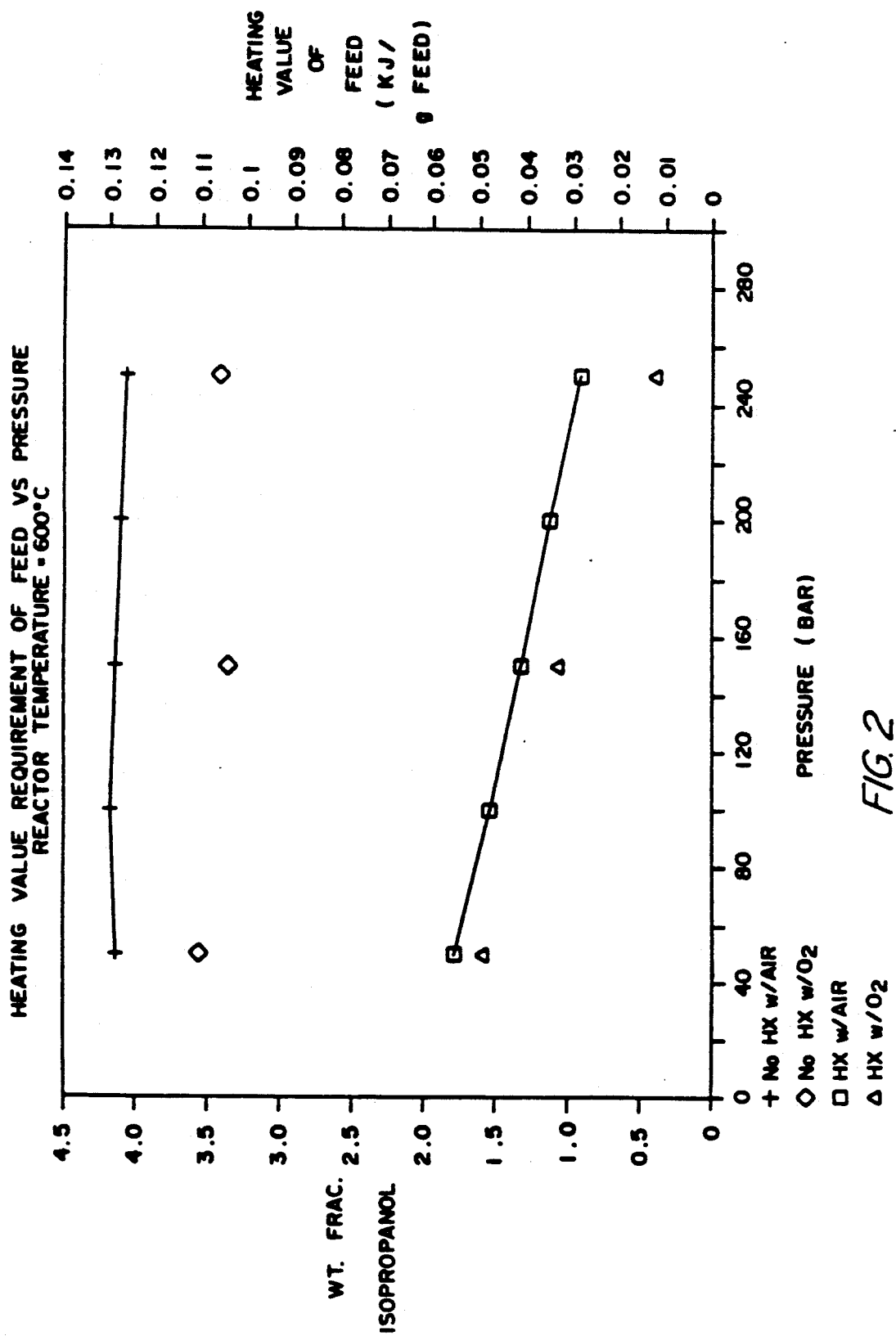
FIG. 2 shows how the feed heating value required for supercritical temperature water oxidation varies with operating pressure.

Computer process simulation was carried out to explore the effect of operating pressure on the feed heating value requirement to achieve a 600° C. reactor temperature. FIG. 2 shows two sets of curves defining this relationship, with heating value on the vertical axis. Pressure is shown on the horizontal axis.

The upper set of curves shows the adiabatic heating value requirement when no preheating of the cold feed is carried out. Such a flow scheme was considered in Example 1 above, and illustrated in FIG. 1. With air as the oxidant, the required heating value is about 4.2 kJ/g, while the pure oxygen as the oxidant the required heating value is reduced to about 3.5 kJ/g. The heating value is reduced with oxygen because there is no need to heat the nitrogen component of air. For either oxidant, required heating value is roughly constant with pressure from 50 bar up to the supercritical pressure of 250 bar.

The lower set of curves pertains to the case in which incoming feed is heat exchanged with reactor effluent. This process configuration is particularly suited to feeds with relatively low fuel value, in the range of 1 kJ/g. With such regenerative heat exchange, required heating value is no longer pressure independent. This is a result of the presence of non-condensible gases in the hot stream, which make it more difficult to condense water vapor and recycle this heat of condensation. As higher pressures facilitate water condensation, heat recovery is more efficient and higher preheat temperatures are attainable. Thus, at 250 bar with pure oxygen as the oxidant, feed with an isopropanol content of about 1 wt. % is suitable. At 50 bar, by contrast, an isopropanol content of nearly 5 wt. % is required.

A process scheme utilizing regenerative heat exchange is depicted in FIG. 3, The waste stream 21 is mixed with dilution water 22 in feed reservoir 23, the purpose of the dilution water being to attain the appropriate temperature rise within the reactor. This step would be omitted if the feed material already had a suitably low heating value. The mixed stream is brought up to system pressure by pump 24, and then passed to heat exchanger 26. In the heat exchanger the aqueous feed stream is heated to a temperature sufficient to guarantee both complete miscibility with air and the attainment of the desired temperature at the reactor exit. Frequently, the temperature of stream 27 will be high enough to cause organic molecules to pyrolyze or reform. Note that the hot stream passing through the heat exchanger 26 is a portion of the reactor effluent.

Oxidant for the process is provided by ambient air, brought to system pressure by compressor 28. Oxidant is provided in stoichiometric or greater quantity to allow for complete combustion. The compressed air, stream 29, is mixed with the preheated aqueous stream 27, and then enters the open tubular reactor 31. The heat of combustion raises the fluid to an appropriate temperature at the reactor exit. Upon leaving the reactor, the effluent stream 32 enters a solids separator 33, if necessary, and is split into two portions—stream 34 passes through the heat exchanger 26 to provide preheating, while stream 35 is directed to an expander-generator for power recovery or else for use as process steam.

With the open pipe reactor of FIG. 3, the preheating step must provide for kindling of the reaction by heating this feed to a temperature at which air is completely miscible, and at which oxidative reaction will commence as soon as air is introduced. This is because little backmixing of fluid occurs within the reactor. This feature also makes plug flow reactors favored in cases where high oxidation efficiency of the feed material must be assured. As illustrated in Example 1, in cases where feed is more concentrated and the reactor is designed to allow some backmixing of fluid and reaction intermediates, it is possible to dispense with the preheating step. The scheme of FIG. 1 is also preferable for feeds which may cause scaling in preheat exchangers.

Recycle of hot reactor effluent to the reactor inlet, by means of a pump or eductor, has been shown in the prior art as a means of attaining rapid reaction initiation. This useful technique for providing rapid heatup of incoming feeds is not shown in FIG. 3 because an energy balance will readily show that the feed fuel value requirement for achieving a given reactor temperature is not affected. The feature of FIG. 3 which makes it suitable for low fuel value feeds is the recycling of heat without the recycling of mass.

Example 3

Figure 4:
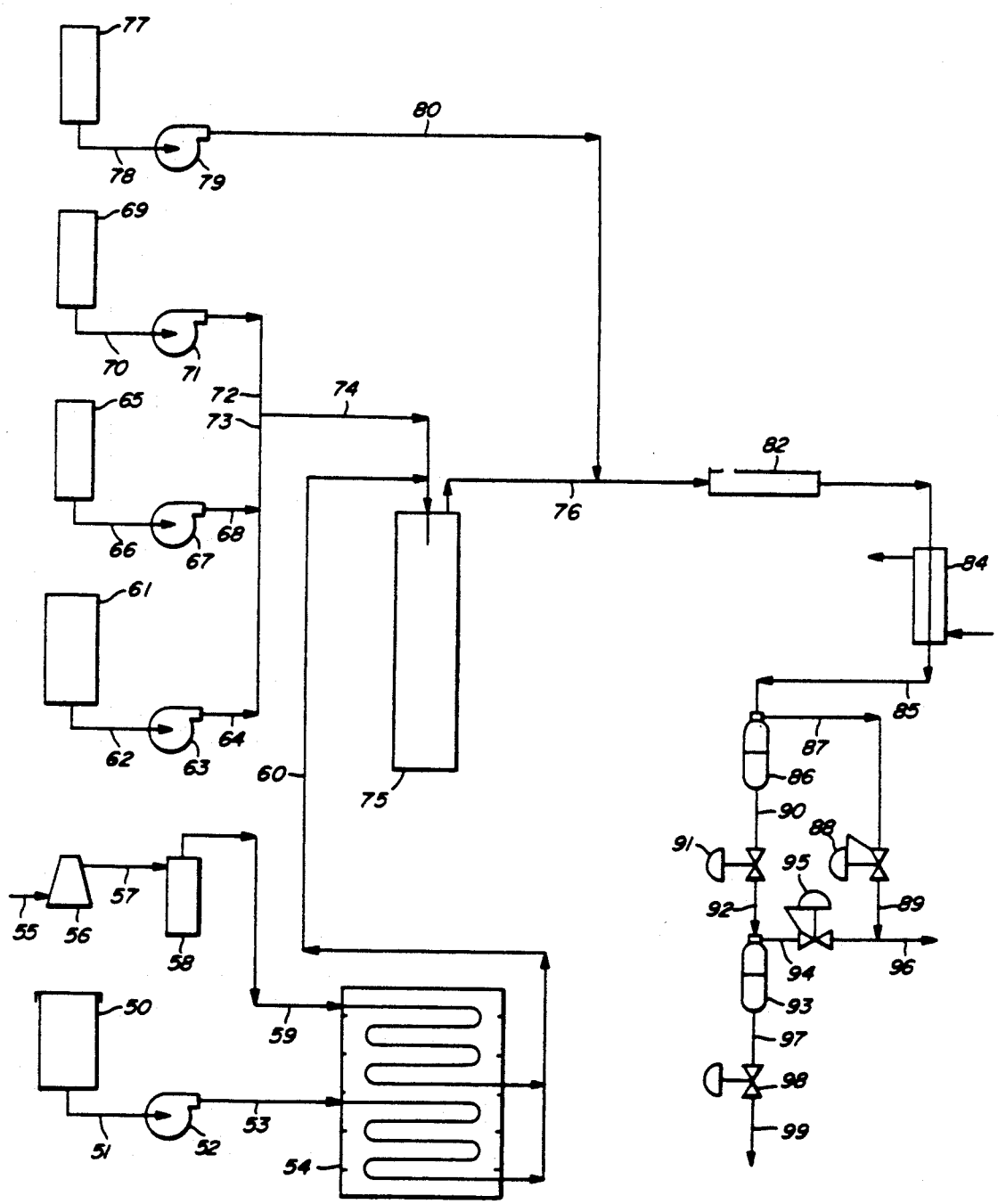
FIG. 4 depicts an apparatus used to conduct certain experiments discussed in the examples.

Two experiments were carried out to oxidize isopropanol in a supercritical temperature water oxidation system over a range of supercritical and subcritical pressures. FIG. 4 is a schematic of the unit used for this work. The high pressure pumps and oxidant compressor are on the left side of the diagram. The oxidant compressor 56 can be operated with room air or with gas supplied directly from cylinders. Deionized water is pumped up to system pressure by the water pump 52 and passed through superheater 54 to bring it to a supercritical temperature. This water is mixed with oxidant, which has also been pressurized and preheated, and the combined stream is then injected through line 60 into the first stage reactor/solids separator.

Waste feed, fuel, and caustic, if used, are pumped up to pressure separately through pumps 63, 67, and 71. No feed preheating is carried out on this apparatus. The feed, fuel, and caustic are mixed in line 74 and injected into the first stage reactor/solids separator 75 where they contact the oxidant/supercritical temperature water stream, initiating a rapid reaction. Inorganic solids precipitate from the supercritical fluid, impinge on the walls and settle to the reactor bottom. The particle-free fluid leaves the first stage reactor/solids separator through line 76 and passes to a second stage plug flow reactor 82 to ensure adequate residence time. Auxiliary fuel is sometimes added via pump 79 near the inlet of the second stage reactor to offset heat losses or achieve a higher temperature than in the first stage.

The fluid stream exits the second stage reactor and passes through a cooldown exchanger 84 where a two-phase mixture of gas and liquid forms as the temperature becomes subcritical. The phases are separated in a high pressure liquid/vapor separator 86 which operates at system pressure. The gas stream pressure is reduced to near ambient through valve 88, while the liquid stream is reduced to about 7 bar pressure through valve 91, leading to the further evolution of gas (mostly $CO_2$) in line 92. This two-phase stream then enters a low pressure liquid/vapor separator 93. The liquid stream exiting this vessel through line 97 and valve 98 is sampled or disposed of, while the gas stream leaving the vessel through line 94 and valve 95 mixes with the gas stream from the high pressure separator in line 89 and is sampled or vented. After an experiment, the first stage reactor/solids separator 75 is opened and any accumulated solids are removed.

When operating the unit of FIG. 4 under supercritical water oxidation conditions, it has been found that carbon monoxide in the gaseous effluent is the most sensitive indicator of oxidation efficiency. CO is typically the last remaining product of incomplete carbon combustion, and is the first compound to be observed at increased levels if oxidation is non-optimum. For this reason, the CO in the gaseous effluent was used as a measure of oxidation rate in the two experiments described here. Auxiliary fuel was not used for the tests described here, and as a result little reaction would be expected to occur in the relatively low temperature second stage reactor.

Figure 5:
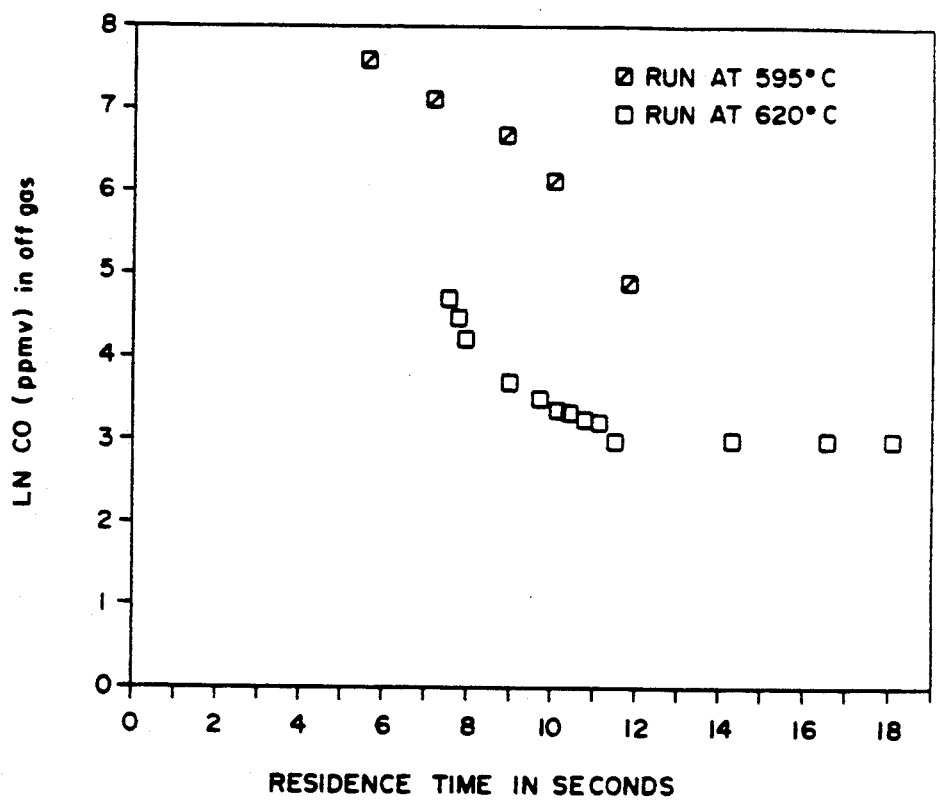
FIG. 5 shows the effect of operating pressure, expressed as the residence time in a constant volume vessel, on CO oxidation rate.

Table 2 shows the results of the two experiments, the first at an average first stage reactor temperature of 620° C. and the second at an average first stage reactor temperature of 595° C. For both tests, system operating pressure was reduced in several steps. CO was expected to rise as pressure was decreased due to the lower fluid density and therefore reduced reactor residence time. For the 620° C. experiment the CO level remained constant at 22 ppm down to a pressure of 172 bar (2500 psi), corresponding to a residence time of about 11.5 seconds in the first stage reactor. As pressure was decreased further, CO rose at a somewhat increasing rate. This is illustrated in FIG. 5, which is a plot of the natural logarithm of CO concentration versus reactor residence time. For an oxidation first order in CO (an assumption supported at supercritical pressures by the work of R. K. Helling and J. W. Tester, *Energy Fuels*, 1987, 1, 417), this plot should be a straight line. The steeper slope at the three lowest residence times may be an indication of a changing reaction mechanism. However, it is also possible that this is an artifact of altered reactor flow patterns at the lower pressures.

TABLE 2

| | CO Oxidation Kinetics | | |
|---|---|---|---|
| P (psia) | P (bar) | Effluent CO (pm) | Sec. Res. Time |
| Experiment 1: T = 620° C. | | | |
| 3753 | 259 | 20 | 18.1 |
| 3500 | 241 | 20 | 16.6 |
| 3000 | 207 | 20 | 14.3 |
| 2500 | 172 | 20 | 11.5 |
| 2400 | 165 | 25 | 11.2 |
| 2350 | 162 | 26 | 10.6 |
| 2250 | 155 | 28 | 10.5 |
| 2200 | 152 | 29 | 10.2 |
| 2100 | 145 | 33 | 9.8 |
| 1950 | 134 | 40 | 9.0 |
| 1750 | 121 | 68 | 8.0 |
| 1700 | 117 | 87 | 7.8 |
| 1650 | 114 | 110 | 7.6 |
| Experiment 2: T = 595° C. | | | |
| 2034 | 140 | 134 | 11.9 |
| 1735 | 120 | 456 | 10.1 |
| 1545 | 107 | 802 | 8.9 |
| 1269 | 67 | 1222 | 7.2 |
| 998 | 69 | 1978 | 5.7 |

At 595° C. as expected, CO levels are higher than at 620° C. for a given reactor residence time. This is shown in Table 2 and FIG. 5. The rough linearity of the data in FIG. 5, as well as the observation of stable reactor temperatures indicates that the reaction is self-sustaining at 70 bar (1000 psi), the lowest pressure tested. Measurements were discontinued at this point as the infrared CO meter had exceeded its range of 2000 ppm. It is clear, however, that for certain feeds pressures below 70 bar will provide efficient oxidation at residence times considerably less than a minute. It should also be pointed out that use of a plug flow reactor at identical residence times would yield considerably lower CO values than those shown in Table 2.

U.S. Pat. No. 3,804,756 to Callahan, et al., indicates that catalysts are required for oxidation at near atmospheric pressure in the supercritical temperature range. It is thus believed that pressurization to at least about 25 bar is necessary to increase reactant concentrations sufficiently to allow self-sustaining combustion without a catalyst.

It should be noted that the role of water in these oxidation reactions is unclear. It is known that amounts of water up to at least 18 mole percent increase the oxidation rate of CO in conventional combustion (Howard, J. G., G. C. Williams, and D. H. Fine, "Kinetics of Carbon Monoxide Oxidation in Postflame Gases," 14th Symp. (Int.) on Combustion (Proc.) 1973, 975). Under supercritical water oxidation conditions, Helling and Tester's results (1987) indicate that water slows the oxidation rate.

Example 4

In U.S. Pat. No. 4,380,960, Dickinson teaches that alkali catalyst is necessary to achieve efficient combustion at supercritical (with respect to water) temperatures and a wide range of subcritical and supercritical pressures. An experiment was carried out to test this hypothesis by comparing the oxidation of isopropanol with and without the presence of sodium hydroxide. As in Example 3, the level of CO in the gaseous effluent was used as a measure of oxidation efficiency. At reactor conditions of 15.7 bar (2030 psi) and 576° C., CO was 220 ppm without NaOH. At these same conditions, caustic was included in the feeds to the reactor to yield a reactor concentration of about 700 ppm NaOH. CO in the gaseous effluent rose and steadied at about 500 ppm.

In a second experiment, a mixture of coal and isopropyl alcohol was oxidized in the apparatus of FIG. 4, with and without the presence of alkali (as sodium hydroxide). The experimental conditions and results are given in Table 3. No second stage reactor fuel was used, so that any reaction occurring within the second stage reactor would be of minor significance. The amount of alkali added for the second part of the experiment was determined by the level of sulfate in the liquid effluent in the first (no alkali) part of the experiment. This amount was somewhat in excess of that needed to neutralize the first part effluent sulfate.

Conditions within the first stage reactor were deliberately set to give slightly incomplete oxidation, in order to allow comparison between the two cases. As shown in Table 3 by the high organic carbon destruction efficiency, oxidation was very nearly complete in both cases. The small magnitude of the changes in the gas effluent CO and liquid effluent organic carbon make it difficult to ascribe the changes to the presence of alkali or some other minor difference.

TABLE 3

| Effect of Alkali on Coal/IPA Oxidation | | |
|---|---|---|
| | No Alkali | Alkali |
| Reactor Inlet Concentration, mg/kg | | |
| Coal | 8900 | 10700 |
| IPA | 6700 | 6700 |
| Added NaOH | 0 | 290 |
| 1st stage Reactor Temperature, °C. | 577 | 577 |
| System Pressure, bar | 207 | 207 |
| Residence Time, seconds | 26 | 26 |

TABLE 3-continued

| Effect of Alkali on Coal/IPA Oxidation | | |
|---|---|---|
| | No Alkali | Alkali |
| Oxidant | Air | Air |
| $O_2$ in effluent gas, mol % | 10.4 | 7.5 |
| CO in effluent gas, ppm | 135 | 153 |
| Organic carbon in effluent liquid, ppm | 1.2 | 0.7 |
| Sulfate in effluent liquid, ppm | 226 | 20 |
| Estimated organic carbon destruction efficiency, % | 99.992 | 99.996 |

Clearly, alkali catalyst is not a general requirement for rapid and efficient reaction at supercritical temperatures, as would be inferred from U.S. Pat. No. 4,380,960.

Example 5

As previously described, salts are separated in the apparatus of FIG. 4 by a combination of gravity and impingement upon the walls of the first stage reactor/solids separator. This separation is not perfectly efficient; typically a few percent of the solids present remain entrained in the fluid stream. For certain types of solids, this will lead to rapid plugging of the small diameter lines used in the system once the first stage reactor has been exited. To avoid premature shutdown from this cause, a filtering device has been developed to prevent particulate carryover. An experiment was carried out with a 2 wt. % NaCl, 1 wt. % $Na_2SO_4$ feed at both subcritical and supercritical pressures to allow a comparison of solids separation and filter behavior. Table 4 summarizes the test conditions and results. After 41 minutes at 234 bar operating pressure, a differential pressure of 2 bar had built up across the filter due to solids deposition. This is an indication that the unit would soon have to be taken off line and the filter cleaned. In contrast, when operating at 138 bar system pressure, differential pressure across the filter only increased by 0.2 bar after 2 hours. It is believed that the lower pressure favorably affected the properties of salt on the filter by avoiding solid "melting." In other words, at lower partial pressures of water there is less tendency for the water to dissolve the salts to form a concentrated brine or melt. This discovery is of crucial importance to the operation of various solids separation schemes.

TABLE 4

| Destruction of Model Salt-Containing Waste at Subcritical and Supercritical Pressures | | |
|---|---|---|
| | Run 418A | Run 418B |
| Feed, wt. % | $H_2O$-86.5, $iC_3H_8$-10.8, NaCl-1.8, $Na_2SO_4$-0.9 | |
| Reactor P, bar | 234 | 138 |
| Reactor Temp., °C. | 584 | 580 |
| Residence Time, seconds | 16 | 16 |
| Oxidant | Air | Air |
| Excess $O_2$, % stoichiometric | 50 | 43 |
| Time to 2 bar (30 psi) across filter | 41 min. | >2 hrs. |

Example 6

Figure 6:
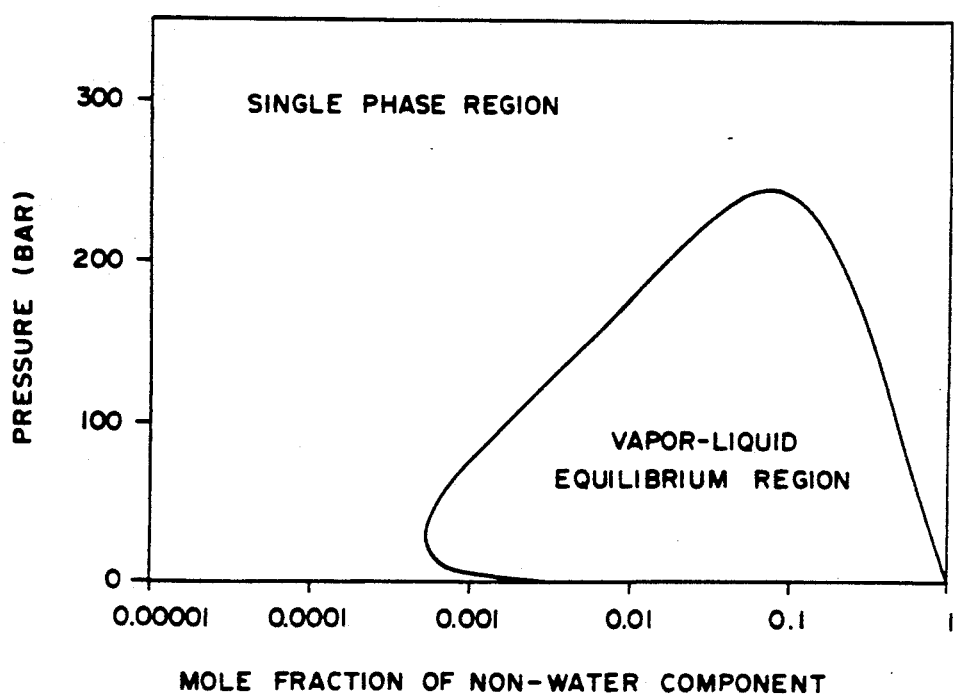
FIG. 6 shows a typical vapor-liquid equilibrium curve at a supercritical temperature.

In some cases, the subcritical pressure oxidation will be preferred to a supercritical pressure oxidation because of a favorable vapor-liquid equilibrium condition. FIG. 6 gives an example of one type of binary (two chemical components) phase behavior which is likely to occur at a temperature supercritical with respect to water. The amount of the non-water component is shown on the horizontal axis while pressure is varied along the vertical axis. The single-phase and two-phase vapor-liquid regions are separated by the curve envelope shown. Within the two-phase region the endpoints of a horizontal line will intersect the curve envelope at two points. The left endpoint gives the vapor composition while the right endpoint shows the liquid composition of the coexisting phases. Note that at supercritical pressures (>221 bar) vapor-liquid equilibrium is attainable over only a very limited range of compositions. Furthermore, the liquid and vapor compositions are fairly similar, each containing a significant amount of both components. Component separation is considerably easier at subcritical pressures, as the vapor-liquid equilibrium region covers a much wider composition range. Now the liquid phase is greatly enriched in the non-water component, and the vapor phase is greatly enriched in water. For this reason, supercritical temperature water oxidation might be preferred over supercritical water oxidation in this application. Only very limited phase equilibrium data are available in the pressure and temperature range of interest, and the actual shape of the phase regions are known for only a few compounds. It is believed, however, that behavior similar to that illustrated in FIG. 6 will be observed for mixtures of water with compounds which have a melting point less than about 600° C. and a boiling temperature greater than that of water. Important examples of such compounds are sodium hydroxide, sulfuric acid, and ammonium sulfate.

Figure 7:
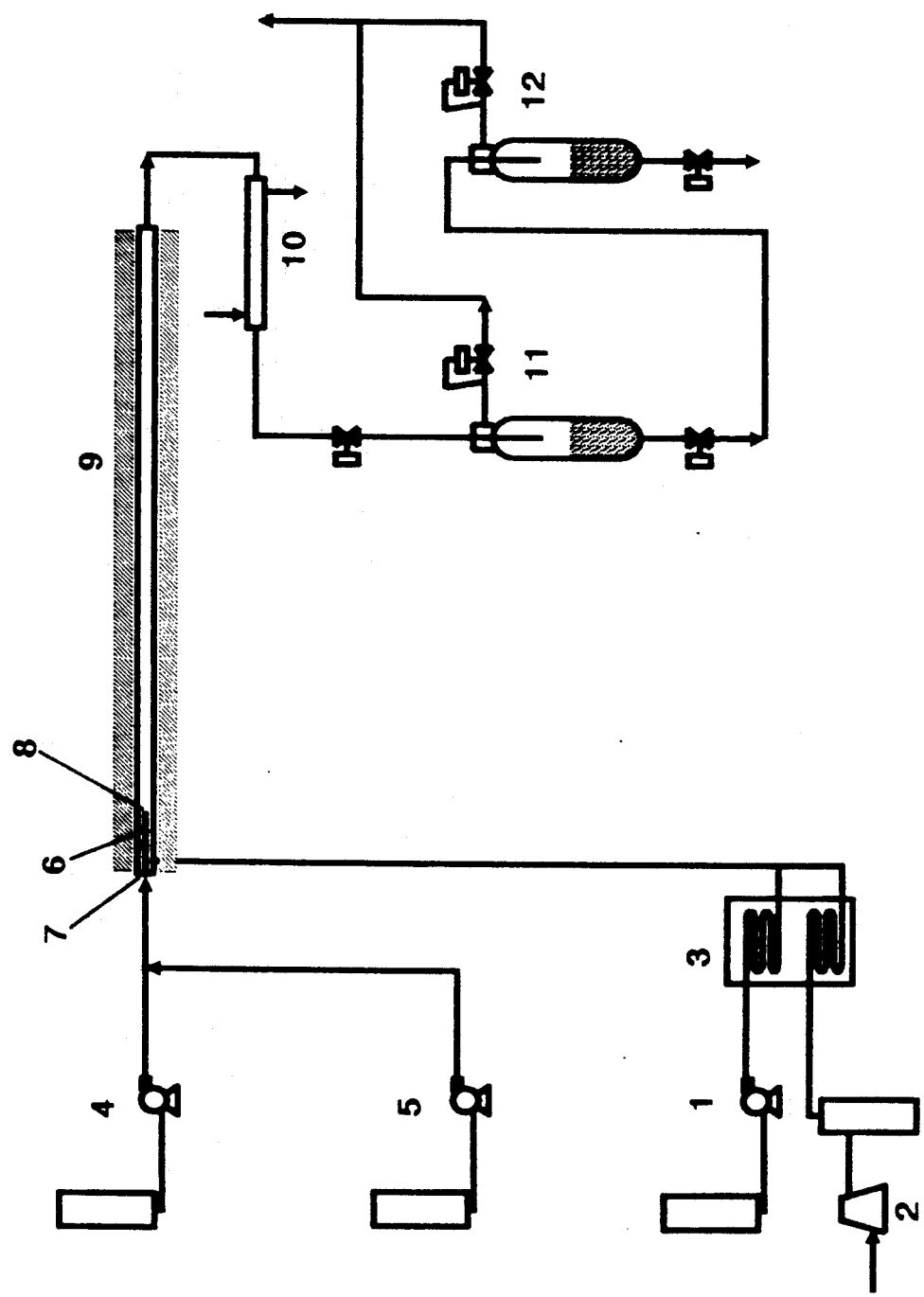

FIG. 7 illustrates the apparatus used to demonstrate the use of reaction rate enhancers in Example 7 to 11. The high pressure pump 1 and the air compressor 2 feed water and air into a preheater 3. The air and water steams are combined at a pressure of 235 bar and a temperature of roughly 500° C. and introduced into the annulus between the reactor wall and the nozzle 6.

High pressure pumps 4 and 5 bring the cold feed water and organic feed respectively to 235 bar. The two cold streams are mixed to provide a 12 wt % isopropanol in water solution just prior to being introduced into the nozzle at 7. The nozzle is insulated between the annulus and the core to minimize heating of the feed before it enters the reactor.

Mixing of the hot water/air stream with the cold water/organic feed stream at the reactor inlet 8 raises the temperature of the combined stream to near critical or supercritical. The mix temperature is controlled by varying the relative flow rates of the hot and cold streams.

The 6.2 m pipe reactor 9 is not externally heated. As the hot and cold feeds are mixed, the oxidation reaction between the organic feed and the oxygen in the air begins. The exothermic reaction causes the stream temperature to increase along the length of the reactor. The temperature profile is an indication of the extent of the reaction.

The reactor effluent enters a cool-down heat exchanger 10 where the temperature is reduced to near ambient and a two phase mixture of gas and liquid forms. The pressure of the mixture is reduced in the two stage letdown system which contains two liquid-vapor separators 11 and 12. The first stage 11 operates at a pressure of 100 bar. Most of the $CO_2$ and virtually all of the $N_2$ and unused $O_2$ are removed from the mixture in a gas effluent that exits the top of this separator. The water exits the bottom of the first stage and enters the second stage separator 12 which operates at near ambient pressure. The gaseous effluent from the second stage, mostly the residual $C_2$, is combined with that from the first stage and released. The liquid effluent is released from the bottom of the second stage separator.

Example 7

Experiments were carried out to determine the enhancement effect of added $H_2O_2$ on the rate of oxidation of isopropanol. In these experiments a 12 wt % aqueous solution of isopropanol was oxidized with air in the 6.2 m long tubular reactor fitted with twenty-four thermocouples along its length. The residence time in the reactor was three to six seconds. A mixture of air and supercritical water was introduced into the reactor through the annulus of a coannular nozzle as shown in FIG. 7. The cold isopropanol/water feed was introduced through the inner tube of the nozzle. Mixing commenced at the nozzle tip. The temperature at a point along the reactor was a function of the initial ratio of the supercritical water/air stream to the cold feed stream, the cumulative heat released from the exothermic oxidation reaction and some loss of heat through the reactor walls. The temperature of the fluid stream plotted as a function of distance from the nozzle tip is shown in FIG. 8. The rising temperature gives an indication of the extent of reaction.

The lowest curve is the profile for isopropanol without any added rate enhancer. The temperature at the nozzle tip is 362° C., slightly below the critical temperature of water, 374° C. The fluid temperature rises smoothly into the supercritical region and climbs steadily over the length of the reactor, reaching 444° C. at the exit. The temperature rise corresponds to only half the maximum heat release obtainable with this concentration of isopropanol in an adiabatic system. The conversion of isopropanol to $CO_2$ and $H_2O$ was incomplete in this experiment.

The remaining three curves show the effect of adding 0.75, 1.5, and 3.0 wt % $H_2O_2$ to the cold water/isopropanol feed. These three $H_2O_2$ concentrations represent 0.9, 1.8 and 3.6% of the stoichiometric oxygen requirement respectively. The residual oxygen concentration in the process effluent gas was held constant at 4.3 volume percent throughout this set of experiments. The distance from the nozzle at which the reaction is initiated becomes progressively shorter as the concentration of $H_2O_2$ increases, as evidenced by the shifting of the steep rise in each temperature profile toward the nozzle tip. The maximum temperature occurs near where the reaction has reached completion. The decrease in temperature after the maximum is reached results from heat loss through the reactor walls. No further temperature increase is possible without increasing the organic concentration in the feed. The $H_2O_2$ promotes the initial reaction of isopropanol with oxygen, but does not replace oxygen as the oxidizing agent. Oxygen makes up more than 95% of the total required oxidant.

This set of experiments illustrates the benefit of using $H_2O_2$ as an initial reaction rate enhancer. Without rate enhancement, complete oxidation of isopropanol requires higher initial temperature and/or a longer residence time.

Example 8

FIG. 9 illustrates the enhancement of the rate of oxidation of isopropanol by $HNO_3$. The same experimental design was used as in the preceding example, except that the initial temperature at the nozzle tip was slightly above the critical temperature of water. In these experiments the temperature profile for isopropanol without enhancer has a maximum roughly 550 cm from the nozzle tip. With 2.0% $HNO_3$, supplying 4.6% of the stoichiometric oxygen requirement, however, the maximum as reached at only 200 cm.

Example 9

The experimental results with $H_2O_2$ and $HNO_3$ demonstrate the effect of strong oxidizing agents on the reaction rate of supercritical and hybrid (362° C.) water oxidation. Strong oxidizing agents have high standard reduction potentials. The standard reduction potentials are a measure of the tendency of a chemical species to be reduced relative to the reduction of protons to hydrogen gas when all reactants and products in both reactions are at unit activity. The reduction of protons $$2H^+ + 2e^- \rightarrow H_2(g)$$

is assigned a standard reduction potential of 0.00 V. Since nitric acid is the weakest oxidizing agent which has been demonstrated to provide initiation for supercritical water oxidation reactions, other strong oxidizing agents which can be used as reaction rate enhancers can be chosen from the chemical species with higher reduction potentials than $HNO_3$. Table 5 gives a list of some viable candidates with their standard reduction potentials.

TABLE 5

| Reduction Reaction | E° (V) |
|---|---|
| $O_3(g) + 2H^+ + 2e^- \rightarrow O_2(g) + H_2O$ | 2.07 |
| $S_2O_8^{2-} + 2e^- \rightarrow 2SO_4^{2-}$ | 2.01 |
| $H_2O_2 + 2H^+ + 2e^- \rightarrow 2H_2O$ | 1.78 |
| $HClO_2 + 3H^+ + 4e^- \rightarrow Cl^- + 2H_2O$ | 1.56 |
| $MnO_4^- + 2H^+ + 3e^- \rightarrow MnO_2(s) + 2H_2O$ | 1.51 |
| $HClO + H^+ + 2e^- \rightarrow Cl^- + H_2O$ | 1.49 |
| $ClO_3^- + 6H^+ + 6e^- \rightarrow Cl^- + 3H_2O$ | 1.45 |
| $ClO_4^- + 8H^+ + 8e^- \rightarrow Cl^- + 4H_2O$ | 1.37 |
| $NO_3^- + 3H^+ + 2e^- \rightarrow HNO_2 + H_2O$ | 0.94 |

Example 10

The addition of nitrate to the feed in a supercritical water oxidation reaction has the further beneficial effect of reducing the oxygen required to provide complete oxidation of the organic components of the waste. Table 6 shows the results of an experiment in which the excess oxygen was systematically decreased while other feed components and flow rates remained constant. The effluent levels of nitrate decreased with the decreasing oxygen, indicating more complete reduction of the nitrate at lower excess oxygen levels. At the same time the organic carbon destruction efficiency remained constant at 99.99%. With nitrate in the feed, even with zero excess gaseous oxygen in the system, the carbon destruction efficiency was not compromised. The nitrate was reduced to $N_2O$ or $N_2$ and no harmful $NO_x$ was detected in the gaseous effluent.

TABLE 6

Effect of Residual Oxygen Concentration on Nitrate Reduction

| Percent Oxygen in Effluent | g/min Nitrate in Feed | g/min Nitrate in Effluent | Percent Nitrate Reduced |
|---|---|---|---|
| 4.8 | 2.20 | 0.54 | 75 |
| 1.7 | 2.20 | 0.32 | 85 |
| 1.4 | 2.20 | 0.25 | 89 |
| 0.9 | 2.20 | 0.16 | 93 |
| 0.2 | 2.20 | 0.18 | 92 |
| 0.0 | 2.20 | 0.11 | 95 |
| 0.0 | 2.20 | 0.05 | 98 |
| 0.0 | 2.20 | 0.17 | 92 |
| 0.0 | 2.20 | 0.16 | 93 |

Example 11

When nitrate is introduced into the system as a sodium salt, it can also function as the source of the cation required to neutralize mineral acids formed from the oxidation of heteroatomic molecules. Table 7 comprises the neutralization of HCl, which was produced from the oxidation of methylene chloride, with NaOH and with $NaNO_3$. Both neutralizing agents are equally effective in precipitating HCl from the reacting fluid as NaCl. With $NaNO_3$ the pH of the brine present in the lower portion of the vessel is low, however, compared to the high pH brine resulting from the formation of a strong carbonate buffer system when NaOH is used as the neutralizing agent. The low pH brine is less corrosive than the high pH brine to the metal alloys normally used in supercritical water oxidation.

TABLE 7

Effect of Neutralizing Agent on Liquid Effluent and Brine Quality

| | $NaNO_3$ | NaOH |
|---|---|---|
| | Liquid Effluent | |
| pH | 1.4 | 1.6 |
| [Cl$^-$] | 0.032 M | 0.033 M |
| [Na$^+$] | 0.0014 M | 0.009 M |
| | Brine | |
| pH | 5.1 | 9.6 |
| [Cl$^-$] | 0.33 M | 1.0 M |
| [Na$^+$] | 1.0 M | 1.4 M |

The invention has been described with reference to its preferred embodiments. One skilled in the art may appreciate from this description changes or variations which may be made which do not depart from the scope or spirit of the invention described above and claimed hereafter. Many other embodiments and applications may be envisaged without departing from the scope of this invention. Variations on the process flow scheme might include:

(a) recycle a portion of the reactor effluent to provide preheating;

(b) inorganic removal as a slurry or solution, rather than as dry solids;

(c) various other reactor types, for example, packed bed or fluidized bed;

(d) use of less than stoichiometric oxygen when partial combustion is desired;

(e) a discrete portion of the apparatus providing for organic reforming;

(f) use of multiple reactors;

(g) use of oxygen containing gases other than air;

(h) use of contaminated gas as or in addition to the oxidant, to allow purification of gas and/or liquid streams;

(i) use of oxidants other than or in addition to those containing gaseous $O_2$, for example, hydrogen peroxide, ozone, nitric acid, or nitrates, nitrites, nitrous oxide, perchlorate, etc.;

(j) treatment of streams which do not require the addition of supplemental oxidant, for example ammonium perchlorate;

(k) introduction of oxidant gas upstream of the heat exchanger to help avoid fouling;

(l) coupling of the air compressor to an expander operated by a process effluent; or (m) a batch mode of operation.

The process is suited to a wide variety of feeds, including the following:

(a) liquid, gaseous, and solid organics including sludges;

(b) coal;

(c) activated carbon;

(d) manufactured polymeric materials;

(e) sewage;

(f) fly ash;

(g) toxic and hazardous chemicals;

(h) soils or sediments contaminated with toxic compounds;

(i) industrial/chemical plant effluents;

(j) brines;

(k) animal waste and byproducts, e.g., manure, tannery, and slaughterhouse effluents;

(l) plants, plant waste, and byproducts, e.g., peat, corn stover, chaff, bagasse, wood waste, pulp, and paper mill effluents;

(m) streams containing microorganisms or their byproducts;

(n) inorganics with COD, e.g., ammonia, hydrogen, carbon monoxide, cyanides; and (o) streams containing adsorbed toxins, e.g., dioxin contaminated sludges and soils.

In some cases, these feeds will be introduced as is, while in others, they will be mixed with other constituents.

We claim:

1. A method for substantially completely oxidizing combustible materials in which an aqueous stream bearing the combustible materials is reacted in the presence of an oxidant comprising diatomic oxygen and at a temperature greater than the critical temperature of water and at a pressure greater than about 25 bar, within a reactor for a period of less than about 5 minutes to produce a reaction product stream, wherein the reaction is initiated in the presence of a rate enhancer comprising at least one oxidizing agent in addition to said oxidant selected from the group consisting of ozone, hydrogen peroxide, salts containing persulfate, salts containing permanganate, nitric acid, salts containing nitrate, oxyacids of chlorine and their corresponding salts, hypochlorous acid, salts containing hypochlorite, chlorous acid, salts containing chlorite, chloric acid, salts containing chlorate, perchloric acid, and salts containing perchlorate.

2. The method of claim 1 wherein the pressure is greater than the critical pressure of water.

3. The method of claim 1 further comprising removing inorganic constituents from the reaction product.

4. The method of claim 1 wherein the reaction rate enhancer comprises up to about 50 percent of the stoichiometric oxygen required during the oxidation process.

5. The method of claim 1 wherein the reaction rate enhancer comprises at least one selected from the group consisting of hydrogen peroxide and nitric acid.

6. The method of claim 1 wherein the reaction rate enhancer also serves to provide cations to neutralize inorganic ions.

7. The method of claim 1 wherein the reaction rate enhancer comprises at least one selected from the group consisting of salts containing permanganate and salts containing nitrate.

8. The method of claim 1 wherein the oxidation is non-catalytic and self-sustaining.

9. The method of claim 1 further comprising obtaining useful energy from the reaction product stream.

10. A method for achieving a destruction efficiency of greater than about 99.0% for combustible materials by reacting an aqueous stream bearing the combustible materials in the presence of an oxidant, comprising diatomic oxygen and at a temperature greater than the critical temperature of water and at a pressure greater than about 25 bar within a reactor for a period of less than about 5 minutes to produce a reaction product stream, and removing non-combustible inorganic constituents from the reaction product stream wherein the reaction is initiated in the presence of a rate enhancer comprising at least one oxidizing agent in addition to said oxidant selected from the group consisting of ozone, hydrogen peroxide, salts containing persulfate, salts containing permanganate, nitric acid, salts containing nitrate, oxyacids of chlorine and their corresponding salts, hypochlorous acid, salts containing hypochlorite, chlorous acid, salts containing chlorite, chloric acid, salts containing chlorate, perchloric acid, and salts containing perchlorate.

11. The method of claim 10 wherein the pressure is greater than the critical pressure of water.

12. The method of claim 10 wherein the reaction rate enhancer comprises between about 0 to about 25 percent of the stoichiometric oxygen required during the oxidation process.

13. The method of claim 10 wherein the reaction rate enhancer comprises at least one selected from the group consisting of hydrogen peroxide and nitric acid.

14. The method of claim 10 wherein the reaction rate enhancer also serves to provide cations to neutralize inorganic ions.

15. The method of claim 10 wherein the oxidation is non-catalytic and self-sustaining.

16. The method of claim 10 further comprising obtaining useful energy from the reaction product stream.

17. A method for oxidizing combustible materials in a reactor comprising:

introducing a continuous aqueous feed stream containing the combustible materials into the reactor;

reacting the feed stream in the presence of an oxidant comprising diatomic oxygen and at a temperature greater than the critical temperature of water and at a pressure greater than about 25 bar for a residence time of less than about 5 minutes, wherein the reaction is initiated in the presence of a rate enhancer comprising at least one oxidizing agent in addition to said oxidant selected from the group consisting of ozone, hydrogen peroxide, salts containing persulfate, salts containing permanganate, nitric acid, salts containing nitrate, oxyacids of chlorine and their corresponding salts, hypochlorous acid, salts containing hypochlorite, chlorous acid, salts containing chlorite, chloric acid, salts containing chlorate, perchloric acid, and salts containing perchlorate;

destroying at least 99.0% of the combustible materials during said residence time to produce a reaction product stream; and obtaining useful energy from the reaction product stream.

18. The method of claim 17 wherein the pressure is greater than the critical pressure of water.

19. The method of claim 17 further comprising removing inorganic constituents from the reaction product.

20. The method of claim 17 wherein the reaction rate enhancer comprises between about 0 to about 25 percent of the stoichiometric oxygen required during the oxidation process.

21. The method of claim 17 wherein the reaction rate enhancer comprises at least one selected from the group consisting of hydrogen peroxide and nitric acid.

22. The method of claim 17 wherein the reaction rate enhancer also serves to provide cations to neutralize inorganic ions.

23. The method of claim 17 wherein the oxidation is non-catalytic and self-sustaining.

24. A method substantially completely oxidizing materials in which an aqueous stream bearing oxidizable materials is reacted with an oxidant comprising diatomic oxygen and at a temperature greater than the critical temperature of water and at a pressure greater than about 25 bar to produce a reaction product stream, and removing non-combustible inorganic constituents from the reaction product stream, including those which are highly soluble in liquid water below 374° C., wherein the reaction is initiated in the presence of a rate enhancer comprising at least one oxidizing agent other than diatomic oxygen selected from the group consisting of ozone, hydrogen peroxide, salts containing persulfate, salts containing permanganate, nitric acid, salts containing nitrate, oxyacids of chlorine and their corresponding salts, hypochlorous acid, salts containing hypochlorite, chlorous acid, salts containing chlorite, chloric acid, salts containing chlorate, perchloric acid, and salts containing perchlorate.

25. The method of claim 24 wherein the pressure is greater than the critical pressure of water.

26. The method of claim 24 wherein the reaction rate enhancer comprises between about 0 to about 50 percent of the stoichiometric oxygen required during the oxidation process.

27. The method of claim 24 wherein the reaction rate enhancer comprises at least one selected from the group consisting of hydrogen peroxide and nitric acid.

28. The method of claim 24 wherein the reaction rate enhancer comprises at least one selected from the group consisting of salts containing permanganate and salts containing nitrate.

29. The method of claim 24 wherein the oxidation is non-catalytic and self-sustaining.

30. A method for removing dissolved non-combustible inorganic materials from water comprising:
introducing an aqueous feed stream containing dissolved noncombustible inorganic materials to a reactor;
introducing combustibles to the reactor as a separate stream or as a constituent of the aqueous feed stream;
reacting the combustibles in the presence of an oxidant comprising diatomic oxygen and at a temperature greater than the critical temperature of water and at a pressure greater than about 25 bar, wherein the reaction is initiated in the presence of a rate enhancer comprising at least one oxidizing agent in addition to said oxidant selected from the group consisting of ozone, hydrogen peroxide, salts containing persulfate, salts containing permanganate, nitric acid, salts containing nitrate, oxyacids of chlorine and their corresponding salts, hypochlorous acid, salts containing hypochlorite, chlorous acid, salts containing chlorite, chloric acid, salts containing chlorate, perchloric acid, and salts containing perchlorate; and
removing noncombustible inorganic constituents from the hot reaction product stream, including those originally dissolved in the aqueous feed stream.

31. The method of claim 30 wherein the pressure is greater than the critical pressure of water.

32. The method of claim 30 wherein the reaction rate enhancer comprises between about 0 to about 25 percent of the stoichiometric oxygen required during the oxidation process.

33. The method of claim 30 wherein the reaction rate enhancer comprises at least one selected from the group consisting of hydrogen peroxide and nitric acid.

34. The method of claim 30 wherein the reaction rate enhancer also serves to provide cations to neutralize inorganic ions.

35. The method of claim 30 wherein the oxidation is non-catalytic and self-sustaining.

36. A method for substantially completely oxidizing combustible materials in an aqueous stream said method comprising:
(a) reacting the aqueous stream bearing the combustible materials in a reactor in the presence of an oxidant comprising diatomic oxygen and at a temperature greater than the critical temperature of water at a pressure less than about 25 bar, wherein the reaction is initiated in the presence of a rate enhancer comprising at least one oxidizing agent other than said oxidant selected from the group consisting of ozone, hydrogen peroxide, salts containing persulfate, salts containing permanganate, nitric acid, salts containing nitrate, oxyacids of chlorine and their corresponding salts, hypochlorous acid, salts containing hypochlorite, chlorous acid, salts containing hypochlorite, chlorous acid, salts containing chlorite, chloric acid, salts containing chlorate, perchloric acid, and salts containing perchlorate; and
(b) allowing the temperature of the aqueous stream to rise above the critical temperature of water while continuing to react the aqueous stream in the presence of the oxidant.

37. The method of claim 36 wherein the pressure in step (b) is greater than the critical pressure of water.

38. The method of claim 36 further comprising removing inorganic constituents from the reaction product.

39. The method of claim 36 wherein the reaction rate enhancer comprises between about 0 to about 50 percent of the stoichiometric oxygen required during the oxidation process.

40. The method of claim 36 wherein the reaction rate enhancer comprises at least one selected from the group consisting of hydrogen peroxide and nitric acid.

41. The method of claim 36 wherein the reaction rate enhancer also serves to provide cations to neutralize inorganic ions.

42. The method of claim 36 wherein the reaction rate enhancer comprises at least one selected from the group consisting of salts containing permanganate and salts containing nitrate.

43. The method of claim 36 wherein the oxidation is non-catalytic and self-sustaining.

* * * * *